Figure 3:
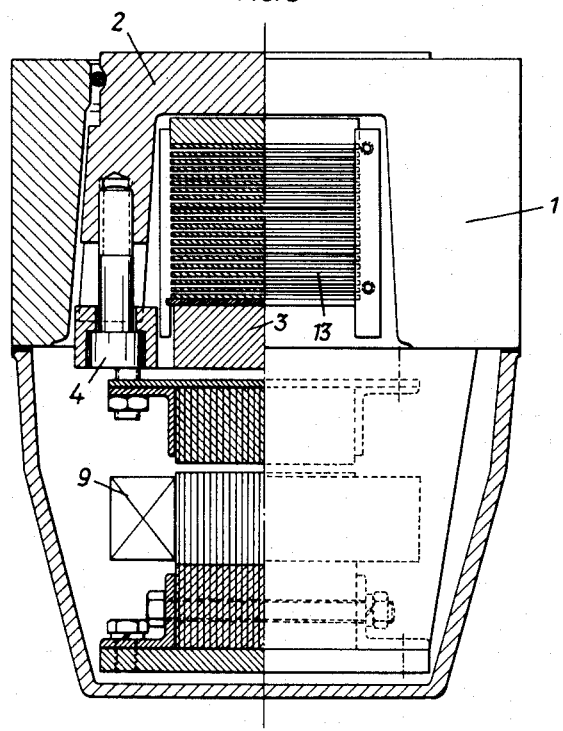

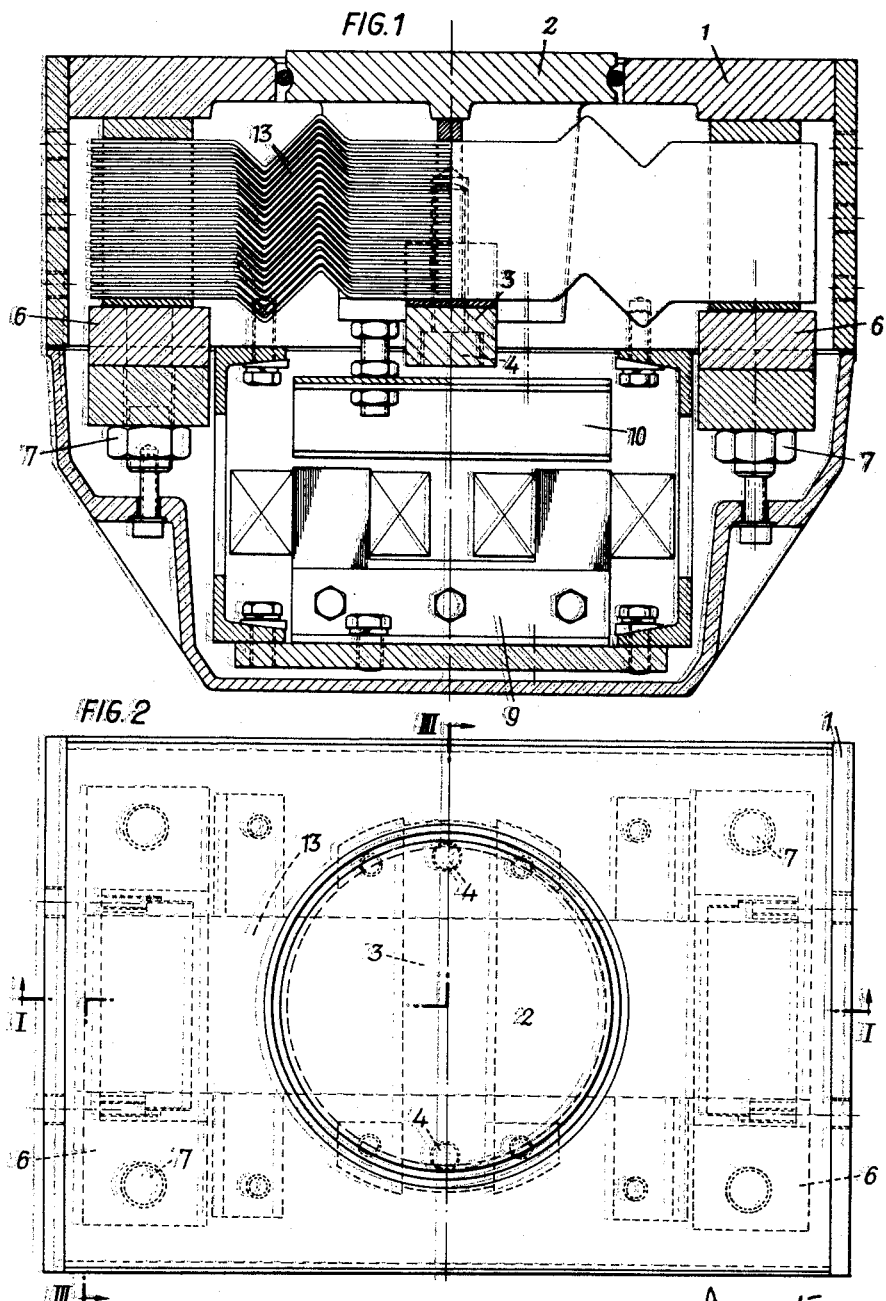

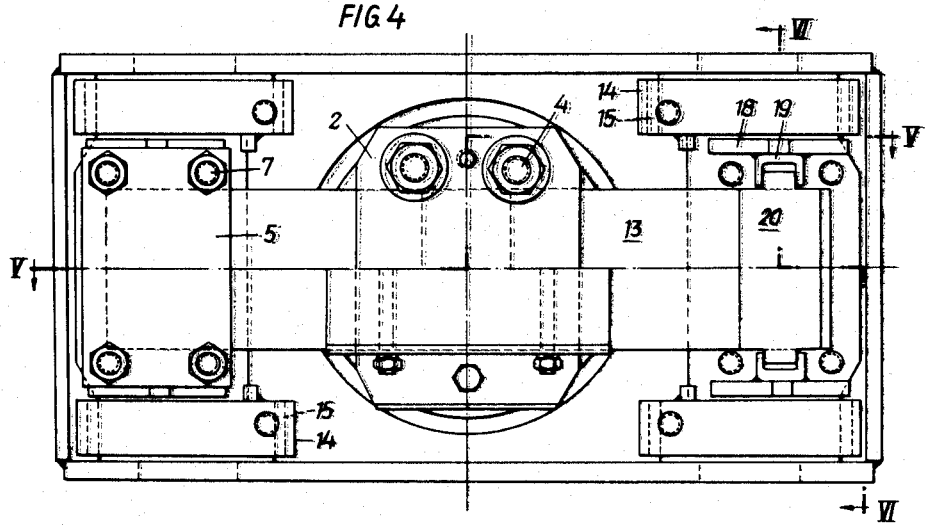
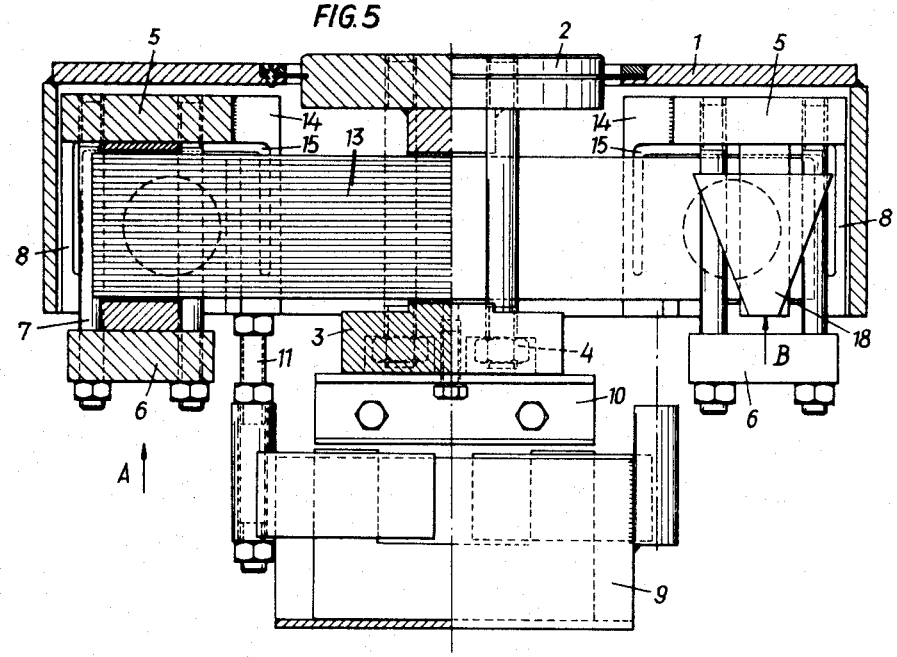

Feb. 16, 1965    K. KUSCHEL    3,170,078
VIBRATORY DRIVE
Filed April 7, 1961    6 Sheets-Sheet 5
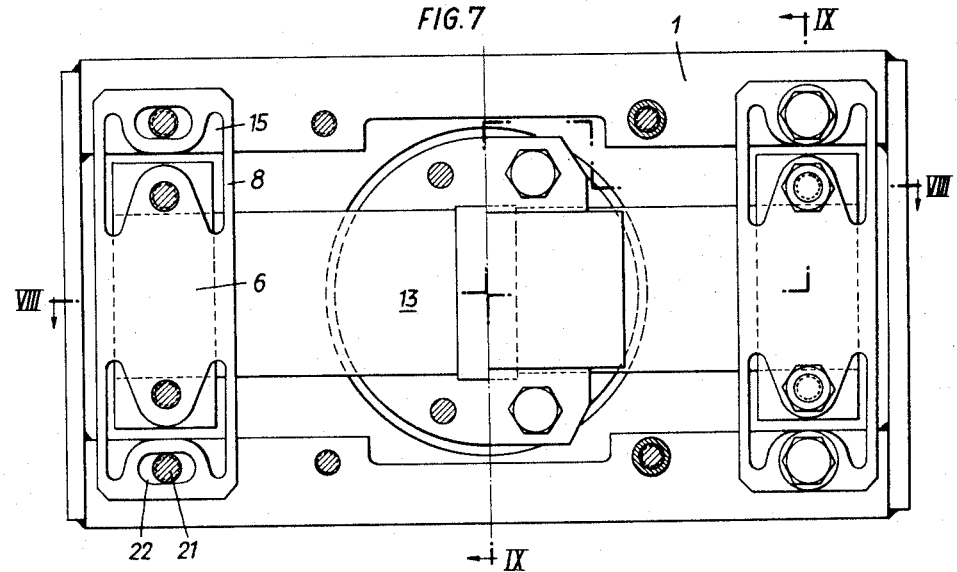
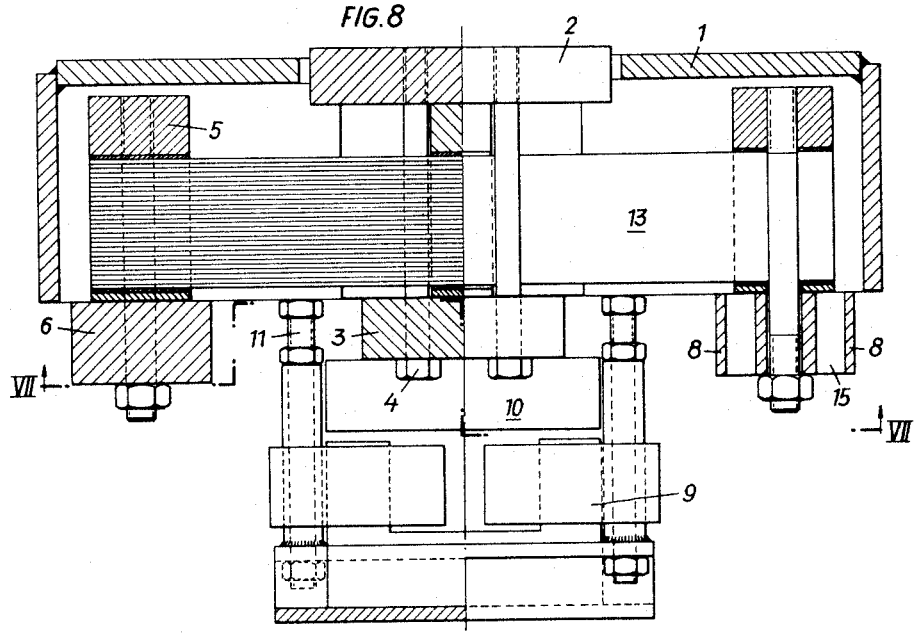

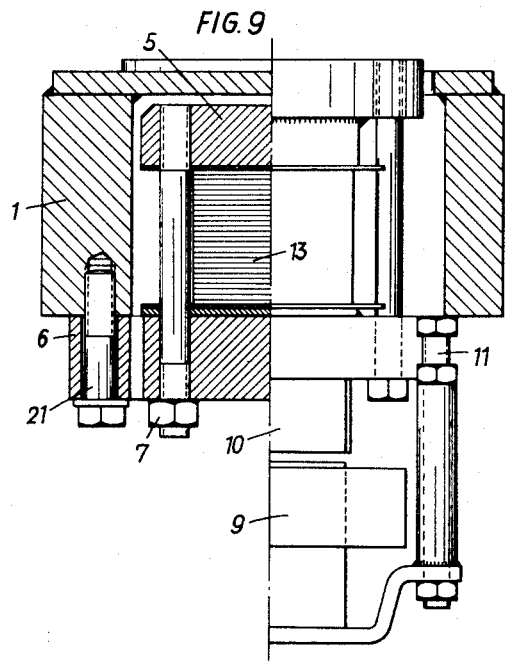
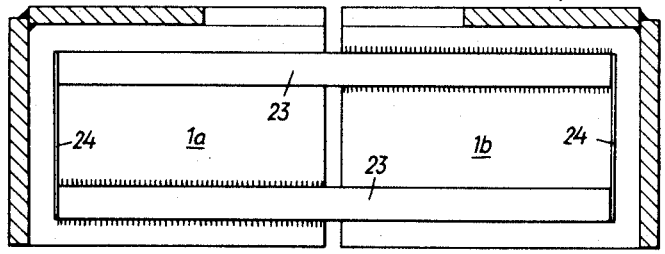
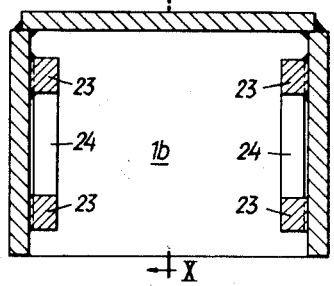

United States Patent Office 3,170,078
Patented Feb. 16, 1965

3,170,078
VIBRATORY DRIVE
Konrad Kuschel, Vienna, Austria, assignor, by mesne assignments, to PVG Patent-Verwaltungs-Gesellschaft m.b.H., Lucerne, Switzerland
Filed Apr. 7, 1961, Ser. No. 101,561
Claims priority, application Austria, Apr. 12, 1960, A 2,787/60
10 Claims. (Cl. 310—29)

The object of the invention is a vibratory drive wherein at least two masses are spring-connected with each other.

There are known already electromagnetic driving mechanisms wherein one mass comprises the clamping-place for the leaf springs and the other mass comprises the clamping place for the mid-portion of the leaf springs. In these clampings of springs, depending on the dimensioning of the clamping elements, either the leaf springs will bring forth by an extension of the spring leaf the elongations required for performing the vibratory movement or the springs will slide in one or both of the external clamping places. In these cases the strains occurring in the springs cause also lasting elongations and longitudinal displacements, respectively, especially with respect to other, superposed sets. The phenomena mentioned above cause uncontrollable clamping conditions of the leaf springs as well as divergences of the characteristic frequency and of the self-damping of the driving mechanism.

According to the present invention these disadvantages are avoided by an endwise yieldingness and compliance, respectively of the springs. This compliance can result either from spring elements provided transverse to the longitudinal direction of from yieldably arranged clamping means. In the drawings the object of the invention is shown in several embodiments by way of example.

Figure 6:
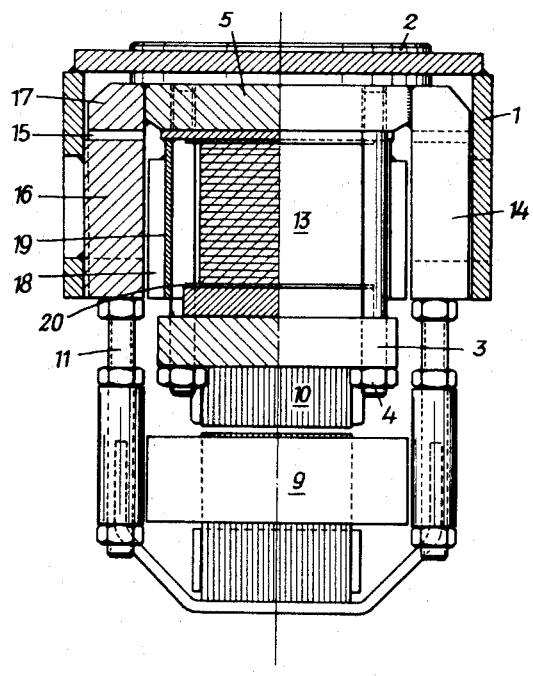

Therein the FIGS. 1 to 3 show an embodiment with firm by clamped and bent leaf springs in vertical and horizontal projection and in side elevation, while in the FIGS 4 to 6 an embodiment is shown wherein straight leaf springs are used its end clamping means, however, being yieldably arranged. In the FIGS. 7 to 9 another kind of yieldable arrangement of the end clamping means is shown. The FIG. 10 finally shows in a vertical projection a divided embodiment of the casing for the compensation for the variations of the distance of the clamping places, while FIG. 11 is a cross section according to the line XI—XI of FIG. 10.

As can be learned especially from FIG. 1 the driving mechanism comprises a casing 1. In said casing an electromagnet 9 is fastened, and at two clamping places a set of leaf springs 13 is fixed by means of clamping plates 6 and clamping screws 7.

In the middle of the set of springs 13 clamping plates 2 and 3 are fixed by means of clamping screws 4. The useful load is connected to said clamping plates 2 and 3. On these elements 2, 3, and 4 also the armature 10 of the magnet is fixed. Thus two vibratory masses are provided; the first one of these masses is constituted by the casing 1 and the electromagnet 9 while the second mass substantially comprises the connected useful load (not shown) as for instance a conveyor trough, bunker offtake or the like, as well as the armature 10 and the clamping plates 2 and 3.

When vibrating, the set of springs 13 will deflect. This deflection will cause either a displacement of the spring ends or an elongation of the springs. Straight leaf springs practically cannot be extended longitudinally; thus, stationary clamping will result in undesired actions of the spring ends in the clamping means. This disadvantage is avoided by providing the springs 13 with a bend in the form of an S symmetrically on both sides of the central clamping place; said bend can accommodate the resulting elongations in such a manner that the end clampings are released thereof.

In the embodiment according to FIGS. 4 to 6 straight springs 13 are used which also are clamped. Here the clamping is effected in the centre by means of four screws 4 and clamping plates 2 and 3, while at each of the outer clamping places clamping plates 5 and 6 as well as four screws 7 are used.

In order to provide a compensation for the movement of the spring ends the lateral clamping plates 5 are connected over control levers or arms 8 to the casing 1. The levers 8 are formed by the lateral cheek straps of plates 14 which are arranged on both sides of the set of springs 13; the plates 14 each have a U-shaped slot 15. The remaining inner portion 16 is connected to the casing 1 by means of spot welding, while the clamping plate 5 is laterally welded to the upper portion 17. Two such plates 14 are provided at each clamping place which are welded to the clamping plate 5 and therewith form a swing saddle or bridge whereto the set of springs 13 is clamped by means of the clamping plate 6 and four screws 7. The four levers or arms 8 at each clamping place are of such dimensions that they compensate for elongations of the spring by elastically yielding.

In this embodiment the electromagnet 9 is fixed to the casing by means of screws 11 which also serve to regulate the air gap between the magnet 9 and the armature 10.

To render possible an adjustment of the operative length of the springs, wedge-shaped adjustment plates 18 are arranged laterally of the set of springs 13, between the latter and the plates 14; the adjustment plates 18 are connected to U-shaped guides 19 which engage the laterally projecting ends of intermediate plates 20. After the lower clamping plate 6 has been loosened the adjustment plates 18 can be displaced in the longitudinal direction of the springs by driving wedges against the opposite wedge-shaped surfaces of plates 18.

In the FIGS. 7, 8, and 9 the lever arrangement is formed somewhat different by from the preceding embodiment. Here the lower clamping plates 6 are provided with two H-shaped slots 15; the remaining lateral cheek straps of said plates 6 form the levers 8. The external clamping of the set of springs 13 is here effected by means of two screws 7. The lower clamping plate 6 is fixed to the casing 1 by means of two screws 21 which extend through oblong holes 22 in the clamping plates 6 to allow an adjustment of the clamping for changing the operative length of the springs.

In the embodiment according to FIGS. 10 and 11 the casing 1 is divided in two halves 1a and 1b; the connection of these is effected not only by the set of springs 13, but also by a system of guiding members 23 and springs 24 arranged on both sides of the set of springs 13, one guiding member being welded to the casing half 1a and the other guiding member to the casing half 1b. Thus a parallelogram-shaped guide is formed. The springs 24 can be replaced also by pliably-elastic cheek straps formed by cutting out a plate as shown in FIGS. 4 to 9.

In the driving mechanisms described above the levers 8 for fixing the lateral clamping plates are arranged in such a manner that the clamping plates can move only along the main axis of the set of springs.

Recapitulating, it will be seen that the present invention reduces the longitudinal forces occurring in the leaf springs by so constituting the lateral spring clamping elements that they may yield in the longitudinal direction of the springs, or by using leaf springs which are capable of yielding in their longitudinal direction, or by a combination of yielding clamping elements and longitudinally yielding leaf springs, and to reduce said forces to such an extent that a displacement of the leaf springs with respect to the clamping means and also a displacement of the leaf springs relative to one another in the clamping means is safely avoided.

The invention is not restricted to the embodiments disclosed as for a displaceable clamping means. Articulation elements, sliding elements and thrust yielding elements or roller elements can also be used and be arranged between the springs and the casing, respectively.

I claim:

1. In a vibratory drive, in combination, elongated spring means; a support; and a pair of connecting means respectively fixed to said elongated spring means in the region of opposite ends thereof and to said support, said connecting means being resiliently yieldable in direction of elongation of said spring means.

2. In a vibratory drive, in combination, a plurality of elongated leaf springs superimposed upon each other; a support; and a pair of combined clamping and connecting means for respectively clamping said superimposed leaf springs in the region of opposite ends thereof to each other and for connecting said clamped ends to said support, at least one of said combined clamping and connecting means being resiliently yieldable in direction of said elongated leaf springs.

3. A vibratory drive comprising, in combination, elongated spring means; first mass means having a pair of portions spaced from each other in direction of elongation of said spring means; a pair of connecting means respectively fixed to said elongated spring means in the region of opposite ends thereof and to said spaced portions of said first mass; a second mass fixed to said spring means substantially midway between the ends thereof; and a vibrator mechanism acting on said spring means substantially midway between the ends thereof for flexing said spring means in direction transverse to the elongation thereof, one of said means being resiliently yieldable in longitudinal direction of said spring means to avoid undesired distortion of said spring means during flexing thereof by said vibrator mechanism.

4. A vibratory drive comprising, in combination, elongated spring means; a first mass having a pair of portions spaced from each other in direction of elongation of said spring means; a pair of connecting means respectively fixed to said elongated spring means in the region of opposite ends thereof and to said spaced portions of said first mass, said connecting means being resiliently yieldable in direction of the elongation of said spring means; a second mass fixed to said spring means substantially midway between the ends thereof; and electromagnetic vibrator means acting on said spring means substantially midway between the ends thereof for flexing said spring means in direction transverse to the elongation thereof.

5. A vibratory drive comprising, in combination, a plurality of elongated leaf springs superimposed upon each other; a first mass having a pair of portions spaced from each other in direction of elongation of said spring means; a pair of combined clamping and connecting means for respectively clamping said superimposed leaf springs in the region of opposite ends thereof to each other and for connecting said clamped ends to said spaced portions of said first mass, said combined clamping and connecting means being resiliently yieldable in direction of elongation of said leaf springs; a second mass fixed to said superimposed leaf springs substantially midway between the ends thereof; and electromagnetic vibrator means acting on said superimposed leaf springs substantially midway between the ends thereof for flexing said superimposed leaf springs in direction transverse to the elongation thereof.

6. A vibratory drive comprising, in combination, elongated spring means; a first mass having a pair of portions spaced from each other in direction of the elongation of said spring means; a pair of connecting means respectively connected to said elongated spring means in the region of opposite ends thereof and to said spaced portions of said first mass, at least one of said connecting means including at least a pair of flexible arms extending substantially parallel to each other and transverse to the elongation of said spring means so that said pair of connecting means provide a connection between said elongated spring means and said spaced portions of said first mass which is resiliently yieldable in direction of the elongation of said spring means; a second mass connected to said spring means substantially midway between the ends thereof; and vibrator means acting on said spring means substantially midway between the ends thereof for flexing said spring means in direction transverse to the elongation thereof.

7. A vibratory drive comprising, in combination, a plurality of elongated leaf springs superimposed upon each other; a first mass having a pair of portions spaced from each other in direction of the elongation of said leaf springs; a pair of combined clamping and connecting means for respectively clamping said superimposed leaf springs in the region of opposite ends thereof to each other and for connecting said clamped ends to said spaced portions of said first mass, each of said combined clamping and connecting means including a U-shaped yoke having each a pair of flanges extending respectively on opposite sides and in the region of the respective ends of said superimposed leaf springs and each of said flanges being formed with a U-shaped slot forming in each of said flanges a central portion and a pair of outer substantially parallel arms extending transverse to the elongation of said springs and having each a cross section so as to be resiliently yieldable in direction transverse to its elongation, said central portions being connected to said spaced portions of said first mass, and each of said combined connecting and clamping means including pressing means for pressing the respective ends of said superimposed leaf springs against the base of the U-shaped yoke; a second mass connected to said spring means substantially midway between the ends thereof; and vibrator means acting on said spring means substantially midway between the ends thereof for flexing said spring means in direction transverse to the elongation thereof.

8. A vibratory drive comprising, in combination, a plurality of elongated leaf springs superimposed upon each other; a first mass having a pair of portions spaced from each other in direction of the elongation of said leaf springs; a pair of combined clamping and connecting means for respectively clamping said superimposed leaf springs in the region of opposite ends thereof to each other and for connecting said clamped ends to said spaced portions of said first mass, each of said combined clamping and connecting means including a U-shaped yoke having each a pair of flanges extending respectively on opposite sides and in the region of the respective ends of said superimposed leaf springs, and a base portion connecting said flanges, said base portion being formed adjacent each of said flanges with a substantially H-shaped slot forming each in said base portion a pair of substantially parallel arms extending transverse to the elongation of said springs and having each a cross section so as to be resiliently yieldable in direction transverse to its elongation, said base portions being connected to said spaced portions of said first mass, and each of said combined connecting and clamping means including pressing means for pressing the respective ends of said superimposed leaf springs against the base of the U-shaped yoke; a second mass connected to said spring means substantially midway between the ends thereof; and vibrator means acting on said spring means substantially midway between the ends thereof for flexing said spring means in direction transverse to the elongation thereof.

9. An arrangement as defined in claim 6 and including means for securing said pair of connecting means at adjustable distances from each other to said first mass.

10. An arrangement as defined in claim 7 and including means for adjusting the distance between said pressing means from each other.

References Cited in the file of this patent

UNITED STATES PATENTS

| | | |
|---|---|---|
| 820,944 | Adams | May 15, 1906 |
| 824,318 | Thorp | June 26, 1906 |
| 1,334,700 | Hill | Mar. 23, 1920 |
| 1,846,326 | Flint | Feb. 23, 1932 |
| 2,063,216 | Zadarka | Dec. 8, 1936 |
| 2,702,369 | Dreyfus | Feb. 15, 1955 |
| 2,973,951 | Billings | Mar. 7, 1961 |
| 2,978,241 | Plastow | Apr. 4, 1961 |
| 2,979,325 | Marquardt | Apr. 11, 1961 |

FOREIGN PATENTS

| | | |
|---|---|---|
| 139,986 | Australia | May 27, 1948 |